United States Patent
Eulenstein et al.

(10) Patent No.: US 6,656,079 B2
(45) Date of Patent: Dec. 2, 2003

(54) DIFFERENTIAL GEAR AND METHOD OF MAKING SAME

(75) Inventors: Tycho Eulenstein, Kassel (DE); Willi Netuschil, Hofgeismar (DE); Rudolf Paasch, Filderstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/810,528

(22) Filed: Mar. 19, 2001

(65) Prior Publication Data
US 2001/0039228 A1 Nov. 8, 2001

(30) Foreign Application Priority Data
Mar. 17, 2000 (DE) .......................................... 100 13 429

(51) Int. Cl.⁷ ............................................. F16H 57/08
(52) U.S. Cl. ....................... 475/331; 475/230; 475/248; 475/901
(58) Field of Search ................................ 475/230, 248, 475/220–253, 331, 901

(56) References Cited

U.S. PATENT DOCUMENTS

| | | | |
|---|---|---|---|
| 4,125,026 A | | 11/1978 | Torii et al. |
| 4,543,854 A | * | 10/1985 | Roth ........................... 475/230 |
| 4,722,244 A | * | 2/1988 | Tsuchiya et al. ............. 475/221 |
| 5,422,071 A | * | 6/1995 | Kiser .......................... 420/581 |
| 5,584,777 A | * | 12/1996 | Sander et al. ................ 475/230 |
| 5,637,049 A | | 6/1997 | Zentmyer et al. |
| 5,643,129 A | * | 7/1997 | Richardson .................. 180/248 |
| 5,651,748 A | * | 7/1997 | Adam et al. .................. 475/204 |
| 6,045,479 A | * | 4/2000 | Victoria et al. ............... 475/160 |
| 6,061,907 A | * | 5/2000 | Victoria et al. ................. 29/463 |
| 6,354,978 B1 | * | 3/2002 | Brackin et al. .............. 475/234 |

FOREIGN PATENT DOCUMENTS

| | | |
|---|---|---|
| DE | 695 10 712 | 9/1999 |
| EP | 0 277 712 | 8/1988 |
| WO | WO99/58287 | 11/1999 |
| WO | WO 99/58287 | 11/1999 |

OTHER PUBLICATIONS

U.S. Ser. No.: 09/810,509, copy of Specification and Filing Receipt.
"Laser and Electronic Welding of Workpiece Combinations Made of Cast Iron and other Steel Products", 1998, pp. 718–723.
"Investigation of Laser Welding of Workpiece Combinations of Cast Iron and Steel", 1994, pp. 1–4, 39, 41–43, and 111–115.

* cited by examiner

Primary Examiner—Christopher P. Schwartz
Assistant Examiner—Devon Kramer
(74) Attorney, Agent, or Firm—Crowell & Moring LLP

(57) ABSTRACT

A differential gear includes a differential housing consisting of cast iron and a differential crown wheel consisting of case hardened steel. The differential gear, while being of reproducible quality, can be produced simply and cost-effectively. The differential housing has, on the circumference onto which the differential crown wheel is pressed, a bearing shoulder, to which the differential crown wheel is fastened via a nickel-containing welded joint. The composition of the welded joint is influenced by the use of a nickel-containing additional material which is added to the welding melt in the form of an annular foil arranged between the bearing shoulder and the differential crown wheel.

9 Claims, 3 Drawing Sheets

DIFFERENTIAL GEAR AND METHOD OF MAKING SAME

BACKGROUND AND SUMMARY OF INVENTION

This application claims the priority of German patent document No. 100 134 29.7-12, filed Mar. 17, 2000, the disclosure of which is expressly incorporated by reference herein.

The present invention relates to a differential gear with a differential housing and with a differential crown wheel, as is used particularly in the automobile sector, and to a method for producing the differential gear.

When a bend is negotiated, the outer wheels of a motor vehicle have to cover a greater distance than the inner wheels. Also, irregular road surfaces cause differences in distance between the individual wheels. When the driving wheels, in these situations, are to roll on the roadway without slipping, they should not be connected to one another by rigid shafts, but must be connected via a differential gear. A differential gear makes it possible to have different rotational speeds of the driving wheels.

The power generated in the engine is transmitted by the drive shaft, at the end of which a driving bevel pinion is located. This driving bevel pinion engages into a differential crown wheel which is connected fixedly in terms of rotation to a housing of the differential gear, the so-called differential housing, and drives the housing. Arranged in the differential housing are differential bevel pinions which are connected to the axle shafts leading to the wheels and which compensate the different speeds of the wheel shafts. Differential housings generally consist of cast iron. In known differential gears, differential crown wheels are manufactured from case-hardened steel. Case-hardened steel refers to steels having a high edge layer hardness, which occurs due to the annealing of the workpiece in carbon-yielding agents and to subsequent quenching. As a result of the annealing operation, the edge layer of the workpieces is enriched with carbon and is hardened from the annealing temperature via the quenching operation.

As a rule, the axis of the drive shaft and of the differential bevel pinion is arranged so as to be offset to the centre of the differential gear (so-called pinion offset), primarily due to the transmission ratio between the driving bevel pinion and the differential crown wheel. In many applications, it is advantageous to avoid a pinion offset, because this leads to the driveshaft running diagonally. This entails various disadvantages. For example, the inclination of the drive shaft is manifested in a higher load on the cardan joints, which, in turn, means higher wear and power loss. Moreover, there are restrictions in the arrangement of the floor assembly, which has effects on construction space and variant diversity.

In known differential gears, the connection between the differential housing and the differential crown wheel is made by screws. The disadvantage of such a screw connection is that a solid flange is necessary on the differential housing. Construction space is required for this flange and also for the screw head and for mounting purposes. Furthermore, a minimum thread depth is necessary for a secure connection. The differential crown wheel therefore has to have a width which can receive the shank of the screw. Moreover, the dimensions of the differential crown wheel must be selected such that it meets stability requirements, particularly because the stress plane of the forces to be transmitted runs through the screw threads. The result of these boundary conditions of construction is that the differential crown wheel must have a minimum size. This minimum size, and also the solid flange and the screw heads, not only have an adverse effect on the weight of the differential gear, but also result in the driving bevel pinion having to be offset in the differential gear thus entailing the disadvantages listed above.

On account of the high carbon contents both in the cast iron of the differential gear and on the surface of the case hardened steel of the differential crown wheel, it is not possible for the structural parts to be welded together. At the concentrations which occur in the case of this material combination, the carbon in the melt forms brittle structural constituents during rapid cooling after welding, which have an adverse influence on the quality of the weld seam, since they may lead to the formation of cracks.

It is known from WO 99/58 287 A1 to weld a case hardened differential crown wheel to a differential housing consisting of cast iron (malleable iron, cast steel or nodular cast iron). For this purpose, prior to welding, the surfaces to be welded together on the otherwise ready-machined structural parts are at least partially stripped for welding preparation, so that, where welding is to be carried out, a narrow groove is obtained. This machining step causes the surface to be removed in the region of the joint on the case hardened differential crown wheel. This region of the structural part has the highest carbon content. Since the carbon fraction in a case hardened steel decreases very sharply at an increasing distance from the surface, the introduction of the groove brings about an extreme reduction in the carbon content at the joint, with the result that the above-described problems in the welding of materials with high carbon contents are reduced considerably. In the differential gear according to WO 99/58 287 A1, welding is carried out, with a welding wire being fed continuously. The weld seam is produced axially with respect to the axis of the differential crown wheel.

This known differential gear entails the disadvantage that both the differential housing and the differential crown wheel must be designed in such a way that they can absorb a shrinkage of the axial weld seam. This is achieved by recesses introduced into the structural parts. These recesses require construction space. Because of the recesses, the structural parts must have correspondingly larger dimensions in order to afford the stability necessary for operation. The result is that, in the known differential gear, the gain in construction space, if there is any at all, is very slight, in comparison with screw-connected differential gears. Nor is this conducive to minimizing the pinion offset.

Shrinkage of the weld seam cannot be avoided, in practice, and, in the known differential gear, entails a tilting of the toothing of the differential crown wheel in spite of the recesses introduced. This leads to inherent stresses in the structural part and also frustrates the aim of achieving a reproducible quality of the differential gear. During operation, the connection is subjected to stress not only by the torsion and the axial and radial loads introduced into the differential crown wheel, but also by inherent stresses. So that the weld seam withstands these stresses, greater welding depths are necessary, which leads to an increased outlay in terms of production and to higher costs.

Another disadvantage of the known differential gear is to be seen in that welding preparation, that is to say the at least partial stripping of the surfaces to be welded together, means an additional work step which has an adverse effect both on the production time and the production costs. Furthermore, the stripping of a case hardened layer entails high machine-cutting costs.

The surfaces of the known gear which are to be welded together consist of two regions: a groove region and a centering region which is arranged below the groove region and at which the differential crown wheel and the differential housing abut on one another. After welding, this centering region has the effect of a notch on the weld-seam root due to shrinkage processes.

Moreover, the continuous feed of welding wire during the welding operation is a disadvantage since this necessitates complicated positioning and control of the speed of the fed welding wire. If there is a fault in these parameters, the additional material is not uniformly distributed over the entire height and length of the weld seam.

Particularly at the seam root, optimum intermixing of the additional material with the melt is not ensured. This problem increases at greater weld-seam depths, such as are necessary in the known structural part for the reasons outlined.

Furthermore, a valve tappet consisting of two metal parts welded to one another is known from EP 0 277 712 A1. One metal part of the tappet consists of alloyed steel or hardenable cast iron; the other consists of a steel with a low carbon content. It is therefore to be considered as weldable. A nickel disc is used for forming an austenitic welding zone. It is also known from DE 695 10 712 T2, in a welded joint, to use a nickel-containing additional material in the case of a cast iron of low weldability.

Against this background, the object on which the present invention is based is to provide a differential gear which, while being of reproducible quality, can be produced simply and cost-effectively. At the same time, in particular, construction space and the use of material are to be optimized and the pinion offset is to be minimized.

This object is achieved by a differential gear according to the present invention. The differential gear has a differential housing consisting of cast iron for example cast iron with modular graphite); a bearing shoulder; and a differential crown wheel consisting of case-hardened steel. The differential crown wheel is connected to the differential housing via the bearing shoulder. The connection consists, according to the present invention, of a nickel-containing welded joint.

Since the differential housing and the differential crown wheel are welded to one another, construction space is saved, because there is no need for any space for a screw head and for mounting purposes. Material is also saved because a flange for receiving the screws is not required and the differential crown wheel does not have to receive a thread and can therefore have smaller dimensions. This leads to a reduction in the weight, which has a positive effect on the production costs. Another result of structural parts having smaller dimensions is to be seen in that the pinion offset is minimized, which makes it possible to optimize the arrangement of the floor assembly and of the drive efficiency.

The bearing shoulder, which is advantageously narrow and short, is beneficial because it is soft, as compared with the differential housing. Axial distortion, can therefore absorb stresses which occur due to the shrinkage of the weld seam. Inherent stresses in the weld seam are thereby reduced considerably. The shape of the bearing shoulder and the displacement of the differential crown wheel due to shrinkage can be compensated within the framework of the setting of the wheel set. In addition, there is no need, in a differential crown wheel and differential housing, to provide any additional recesses which lead to the disadvantages listed in connection with the prior art according to WO 99/58 287 A1.

A further advantage of the bearing shoulder is that, during operation, the axial loads are largely absorbed by this shoulder and are not introduced into the weld seam. The stress on the weld seam is thereby minimized, and the weld-seam depth can be reduced.

According to an advantageous embodiment, the cross section of the weld seam between the differential housing and the differential crown wheel is of wedge-shaped design and has flanks with a low gradient. On account of the low gradient of the flanks, these run almost parallel, this being conducive to the shrinkage of the weld seam extending essentially perpendicularly to the orientation of the weld seam and to the fact that inherent stresses in the structural part can be reduced by the displacement of the differential crown wheel.

It proved particularly advantageous if the bearing shoulder has a rectangular cross section, one side flank of which is designed to be parallel to the weld seam. This geometric arrangement affords the advantage that it allows production-compatible ultrasonic testing of the quality of the weld seam. Moreover, the bearing shoulder may serve for positioning the differential crown wheel exactly on the housing.

There may be provision, furthermore, for a gap to be provided below the weld seam between the differential housing and the differential crown wheel. The advantage of this gap is that the weld seam is free of detrimental actions from below, for example notch effects.

The object described above is also achieved by means of a method for producing a differential gear. Accordingly, a differential housing consisting of cast iron is welded to an unmachined differential crown wheel consisting of case hardened steel (a differential crown wheel which has not been specially prepared for welding) with the aid of a nickel-containing additional material. First, the additional material in the form of an annular foil is pressed onto the differential gear, then the unmachined differential crown wheel is pressed on, and both parts are welded to one another via the additional material. The particular advantage of the method according to the present invention is that the structural parts are welded to one another without their being prepared for welding (i.e., without the surfaces to be welded together being at least partially stripped). This is made possible by the use of a nickel-containing additional material. The nickel of the additional material gives rise, in the solidified weld seam, to buffering between the brittle structural constituents formed during the solidification of the melt and thereby prevents the formation of cracks. By avoiding this preparatory step, the production method is made considerably easier, thus saving time and cost.

The use of the additional material in the form of an annular foil which is laid, prior to welding, between the structural parts to be connected has the advantage that the additional material is laid between the differential housing and the differential crown wheel before welding and is available over the entire height and length of the joint, thus leading to uniform intermixing of the additional material in the melt and therefore to a reproducible seam quality which is constant over the height and length. Furthermore, the exact position of the differential crown wheel on the differential gear can be determined via the thickness of the foil. The presence of the additional material determining the quality of the welded joint can also be monitored via the position of the differential crown wheel on the differential gear. The foil serves, in this case, as a spacer between the bearing shoulder and the differential crown wheel. In a preferred embodiment, the width of the foil ring is selected such that the inner circumference of the ring is greater than the circumference of the differential housing, so that, after welding, a gap between the bearing shoulder and the differential crown wheel is obtained below the weld seam, with the result that the weld seam is free of detrimental actions from below (notch effect).

Other objects, advantages and novel features of the present invention will become apparent from the following detailed description of the invention when considered in conjunction with the accompanying drawings.

DETAILED DESCRIPTION OF THE DRAWINGS

Figure 1:
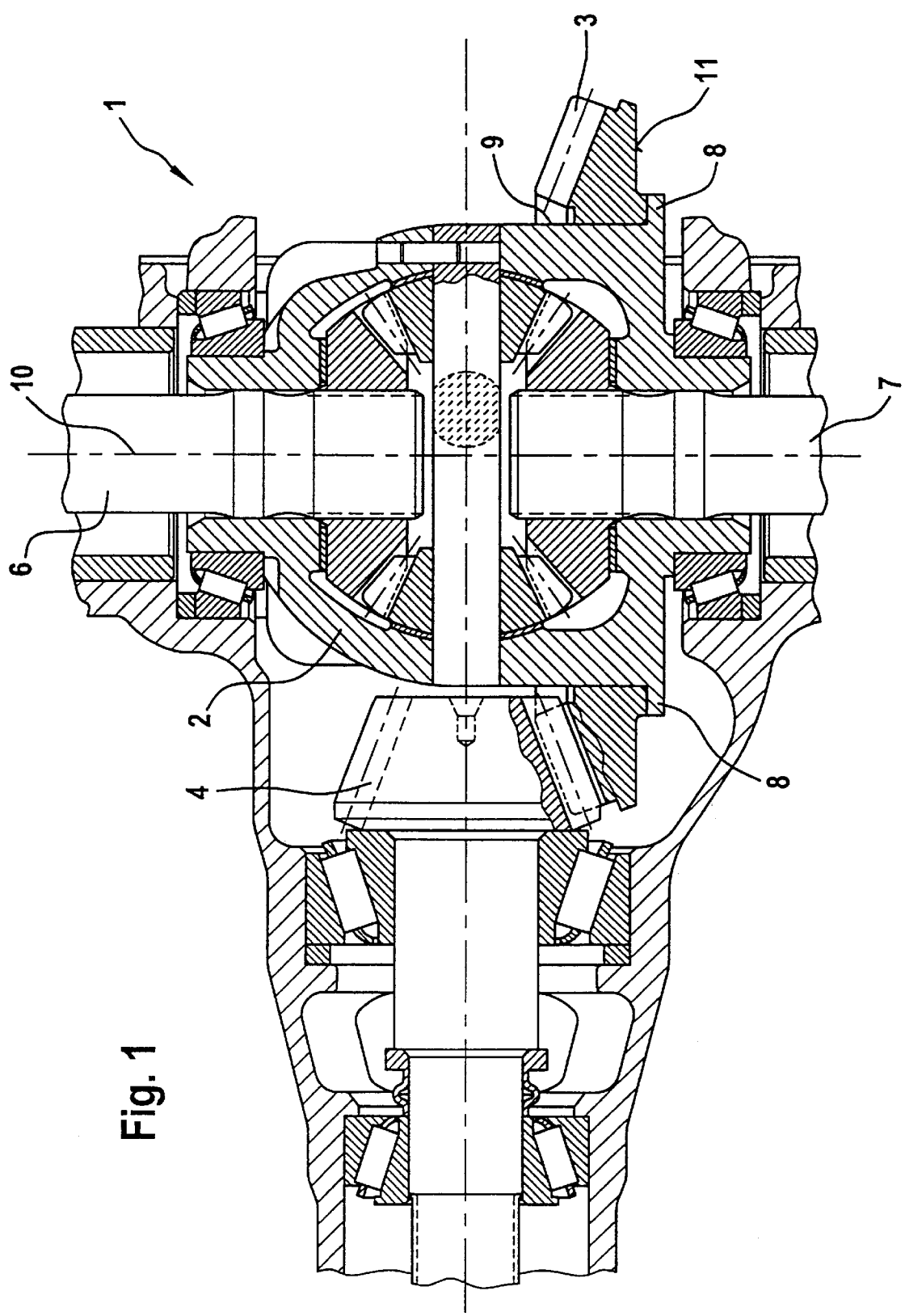
FIG. 1 shows a section through a differential gear according to the present invention.

According to FIG. 1, the differential gear 1 according to the present invention consists of a differential housing 2 consisting of cast iron with nodular graphite and of a differential crown wheel 3 consisting of case-hardened steel. The differential crown wheel 3 is connected to a drive shaft via a driving bevel pinion 4. The power generated by the engine is transmitted from the drive shaft to two wheel-shaft axles 6 and 7 via the differential gear 1. The wheel shafts are designed identically.

In the gear 1, the differential housing 2 is provided with a bearing shoulder 8. The bearing shoulder 8 is integrally formed on that circumference 9 of the differential housing 2 on which the differential crown wheel 3 is pressed and extends beyond the circumference 9 of the differential housing 2 in the radial direction with respect to the axis of symmetry 10 of the differential crown wheel 3. The bearing shoulder has a rectangular cross section which is dimensioned to be so narrow and short that it is soft with respect to shrinkages of a weld seam applied to the bearing shoulder 8. In this respect, "soft" means that the bearing shoulder 8 is capable, during the shrinkage of the weld seam 16, of absorbing stresses possibly occurring due to movement in the axial direction with respect to the axis of symmetry 10 of the differential crown wheel 3. These requirements are satisfied in the case of a width of the cross section of the bearing shoulder 8 of 8 to 9 mm. In the exemplary embodiment illustrated, the differential crown wheel 3 and the bearing shoulder 8 are made slender, with the result that material and construction space can be saved. Furthermore, this configuration contributes to minimizing the pinion offset.

Figure 2:
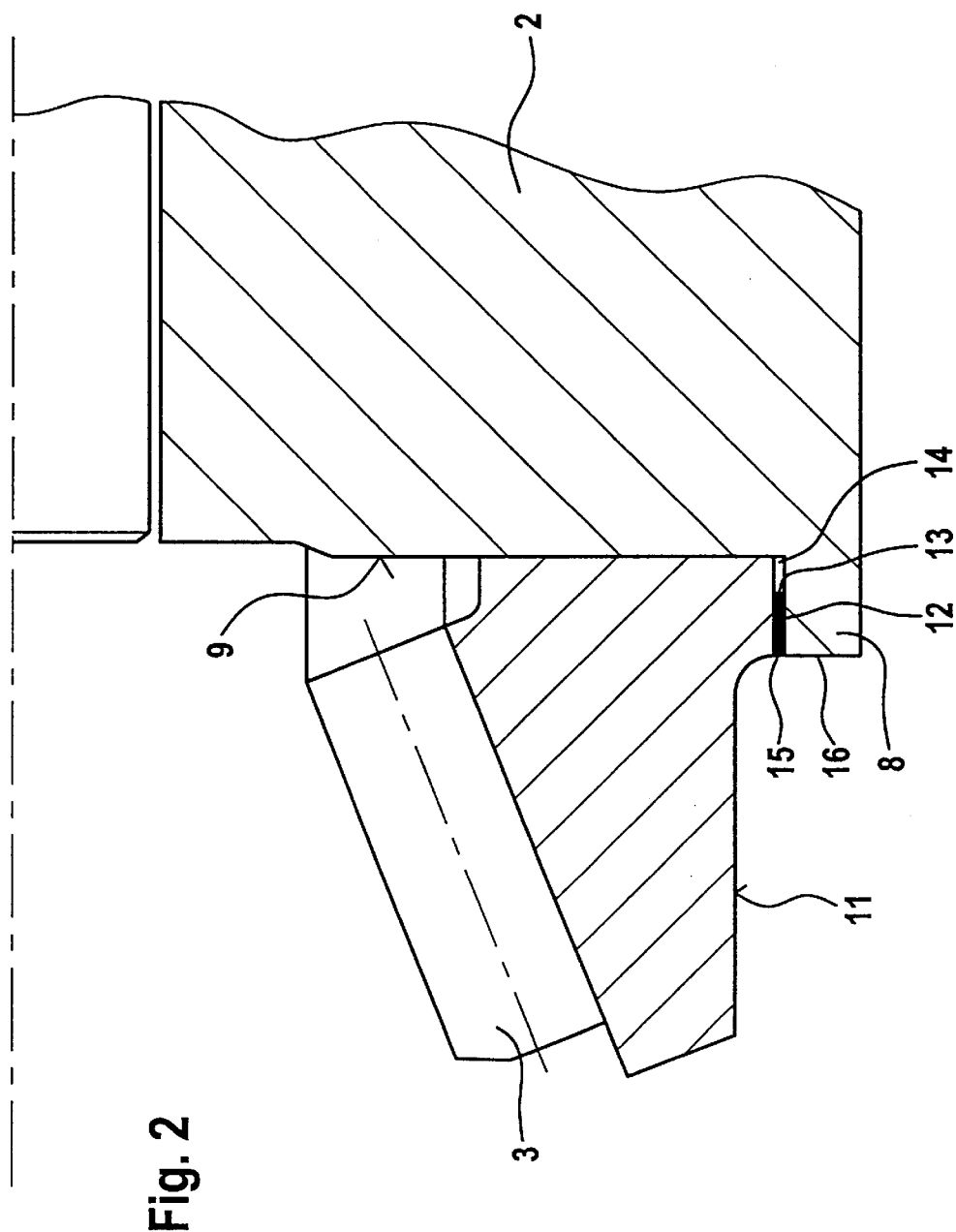
FIG. 2 shows a sectional illustration, in the form of a detail, of the connection point between the differential crown wheel and differential housing prior to the welding of the differential crown wheel and differential housing.

The differential crown wheel 3 is pressed onto the differential housing 2 in such a way that side 11 of said differential crown wheel which faces away from the toothing faces the bearing shoulder 8. Before the differential crown wheel 3 is pressed on, a nickel-containing additional material in the form of an annular foil 12 is pushed onto the differential housing 2, so that, as illustrated in FIG. 2, after said differential crown wheel has been pressed on, the ring 12 comes to lie between the bearing shoulder 8 and the differential crown wheel 3. The ring 12 may serve as a means for positioning the differential crown wheel 3 on the housing 2. The position of the differential crown wheel 3 on the differential housing 2 can be influenced and accurately determined via the thickness of the ring 12. In order to achieve a high-quality weld seam, X10CrNiTi18 9 proved particularly favourable as additional material with a thickness of 0.25 mm. Pure nickel may, however, also be used. The foil may, however, also have a different thickness in the range of 0.1 to 0.3 mm.

The inside diameter 13 of the foil 12 is greater than the circumference 9 of the differential housing 2, so that a gap 14 is obtained between the bearing shoulder 8 and the differential crown wheel 3 below the ring 12. The outside diameter 15 is exactly as large as the circumference 16 of the bearing shoulder 8. This geometric configuration ensures that the additional material is distributed uniformly over the entire height and length of the joint and is optimally intermixed with the melt in all regions during welding. The gap 14 ensures that the weld seam 17 is free of detrimental actions from below.

The use of the additional material makes it possible that the differential crown wheel 3 and the differential housing 2 can be welded to one another in spite of the high carbon contents, without the structural parts having to be prepared for the welding operation. The nickel in the additional material gives rise, in the solidified weld seam 17, to buffering between the brittle structural constituents formed during cooling and thereby prevents the formation of cracks in the weld seam 17.

Figure 3:
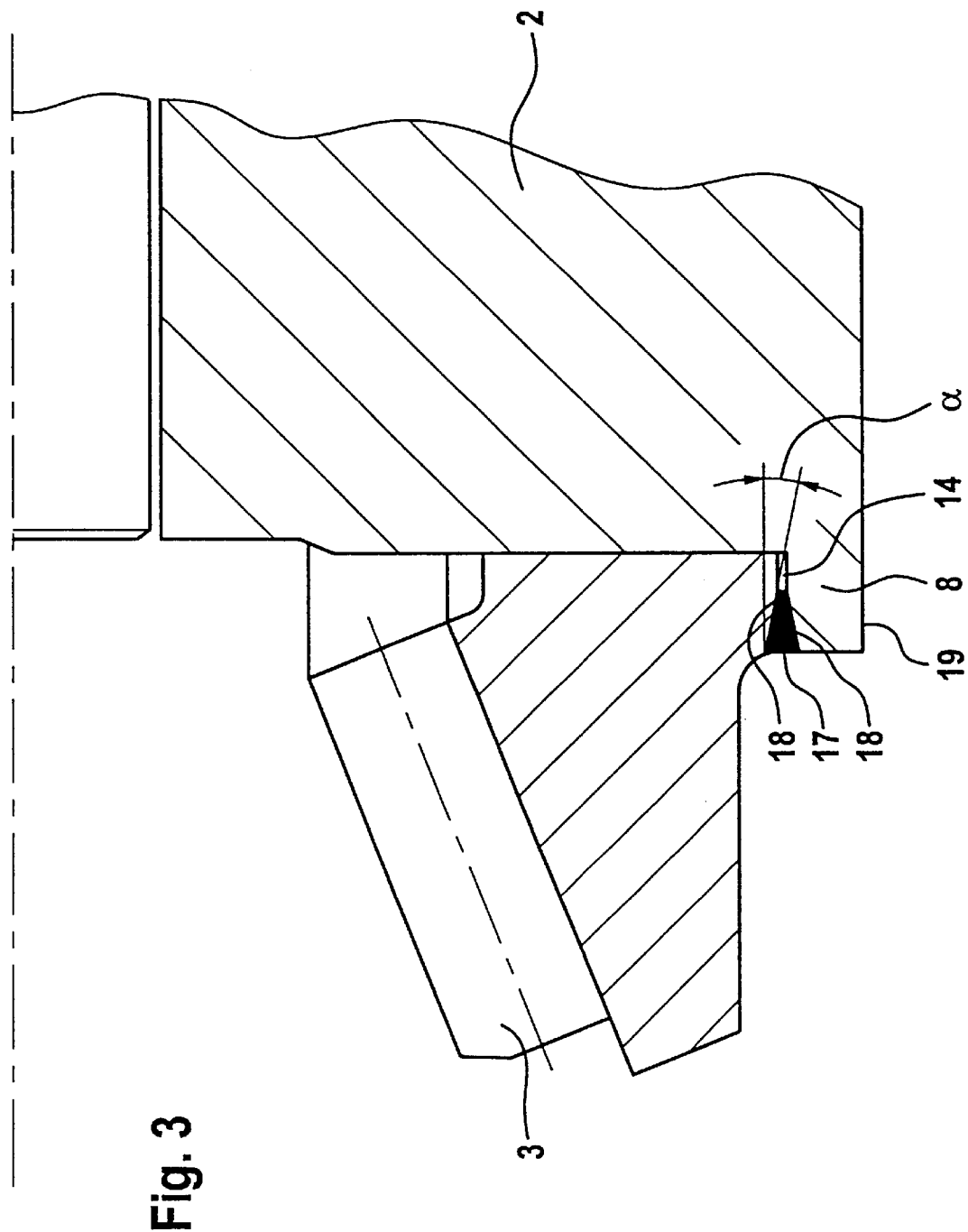
FIG. 3 shows a sectional illustration, in the form of a detail, of the connection point between the differential crown wheel and differential housing after the welding of the differential crown wheel and differential housing.

FIG. 3 shows a section through a differential gear 2 with a differential crown wheel 3 which are welded to one another via the bearing shoulder 8. The weld seam 17 is arranged and is of wedge-shaped design with respect to the axis of symmetry 10 of the differential crown wheel 3. The weld seam has flanks 18 which are distinguished by a low gradient. In the exemplary embodiment illustrated, the angle a amounts to approximately 6°. The result of this low gradient of the flanks 18 is that shrinkage during cooling takes place essentially perpendicularly to the orientation of the weld seam 17. This movement, on the one hand, brings about an axial displacement of the differential crown wheel 3 and is absorbed by the bearing shoulder 8 which, as already stated, is made soft in this respect. The inherent stresses in the weld seam 17 are thereby reduced considerably. The bearing shoulder 8 has an outer flank 19 which runs parallel to the orientation of the weld seam 17. This allows a production-compatible ultrasonic check of the quality of the weld seam 17.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A differential gear, comprising:
    a differential housing comprising cast iron and having a bearing shoulder on a circumference; and
    a differential crown wheel comprising case-hardened steel and arranged on the bearing shoulder,
    wherein the differential housing and the differential crown wheel are connected to one another via a welded joint between the bearing shoulder and the differential crown wheel,
    wherein said welded joint comprises a nickel-containing material.

2. A differential gear according to claim 1, wherein the welded joint is a weld seam.

3. A differential gear according to claim 2, wherein a weld seam cross section has flanks of a low gradient.

4. A differential gear according to claim 3, wherein the low gradient is about 6°.

5. A differential gear according to claim 2, wherein the weld seam is arranged radially with respect to an axis of symmetry of the differential crown wheel.

6. A differential gear according to claim 1, wherein the bearing shoulder extends beyond the circumference of the differential gear housing in a radial direction with respect to an axis of symmetry of the differential crown wheel.

7. A differential gear according to claim 1, wherein the bearing shoulder has a rectangular cross section.

8. A differential gear according to claim 2, wherein an outer flank of the bearing shoulder runs parallel to an orientation of the weld seam.

9. A differential gear according to claim 2, wherein the differential gear has a gap between the bearing shoulder and the differential crown wheel below the weld seam.

* * * * *